E. TAYLOR.
ENGINE.
APPLICATION FILED AUG. 22, 1910.

1,013,907.

Patented Jan. 9, 1912.
2 SHEETS—SHEET 2.

UNITED STATES PATENT OFFICE.

EDWIN TAYLOR, OF FARMINGDALE, NEW YORK, ASSIGNOR TO DAVID M. NEUBERGER, OF NEW YORK, N. Y.

ENGINE.

1,013,907.

Specification of Letters Patent. Patented Jan. 9, 1912.

Application filed August 22, 1910. Serial No. 578,325.

*To all whom it may concern:*

Be it known that I, EDWIN TAYLOR, a citizen of the United States, and resident of Farmingdale, Long Island, New York, have invented certain new and useful Improvements in Engines, of which the following is a specification.

One of the objects of this invention is to construct an engine and generator which will have the minimum weight for maximum power, so that it will be suitable for use where an extremely light and powerful machine is required, as for aeronautical purposes.

Another object is to construct an engine which will be efficient in its operation, simple in construction, and which will have comparatively few working parts so that it is not liable to get out of order.

Another object is to combine the engine and the motive fluid generator in one structure so that the unit will be compact and will occupy a minimum amount of space.

In practically all of the engines which are provided with a reciprocating piston or pistons, the thrust during the working stroke is toward the crank. This will necessarily place the connecting rod under compressive and bending strain, thereby requiring that the connecting rod be rigid enough to take care of this bending strain.

One of the objects of this invention is to construct the engine so that during the working stroke, the connecting rod will be under tension whereby this connecting rod may be made of minimum weight in view of the fact, first, that the tensile strength of most materials is greater than the compressive strength, and second, in view of the fact that the bending strain does not come into play at all.

Further objects will appear from the detail description, taken in connection with the accompanying drawings, in which—

Figure 1:
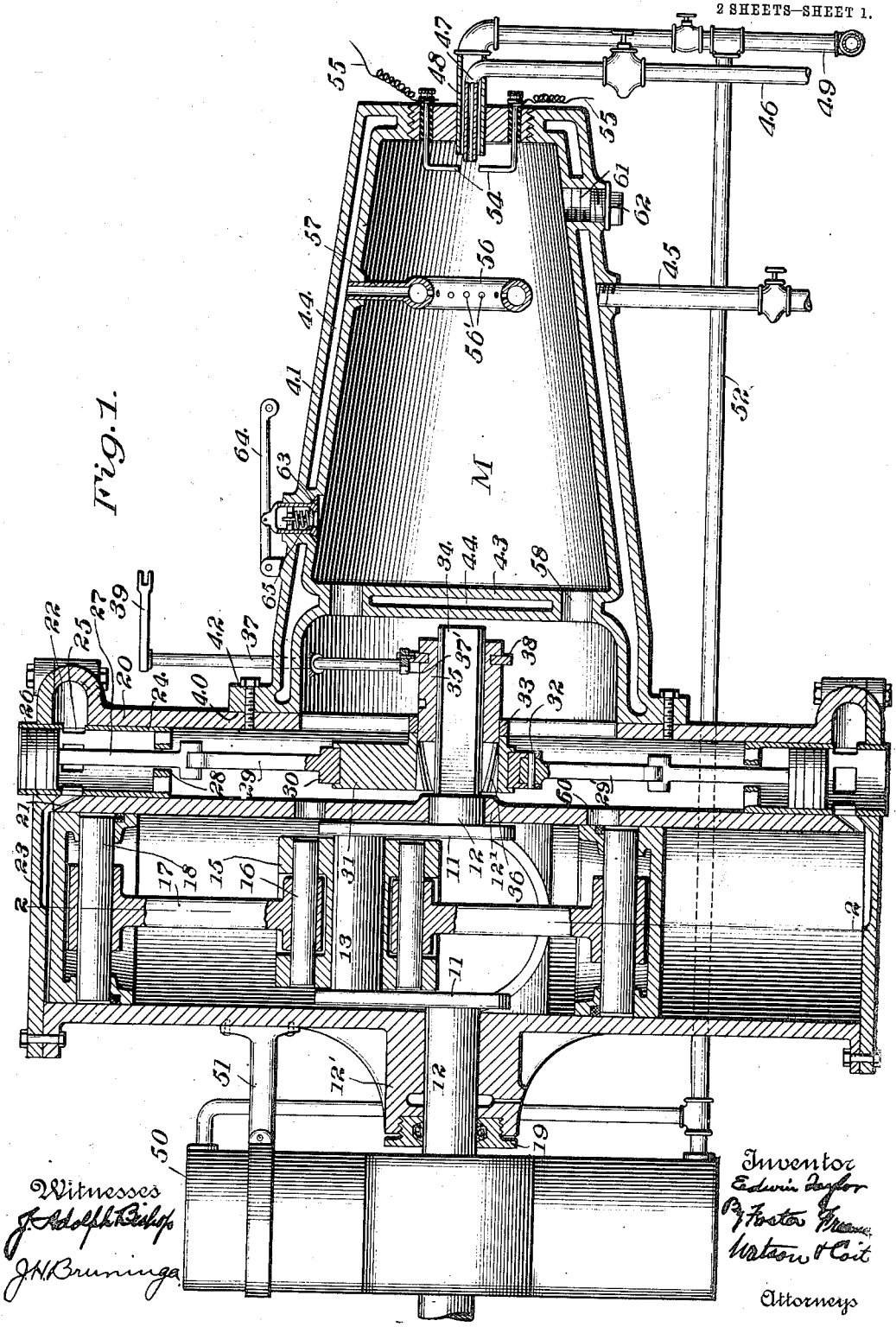
Figure 2:
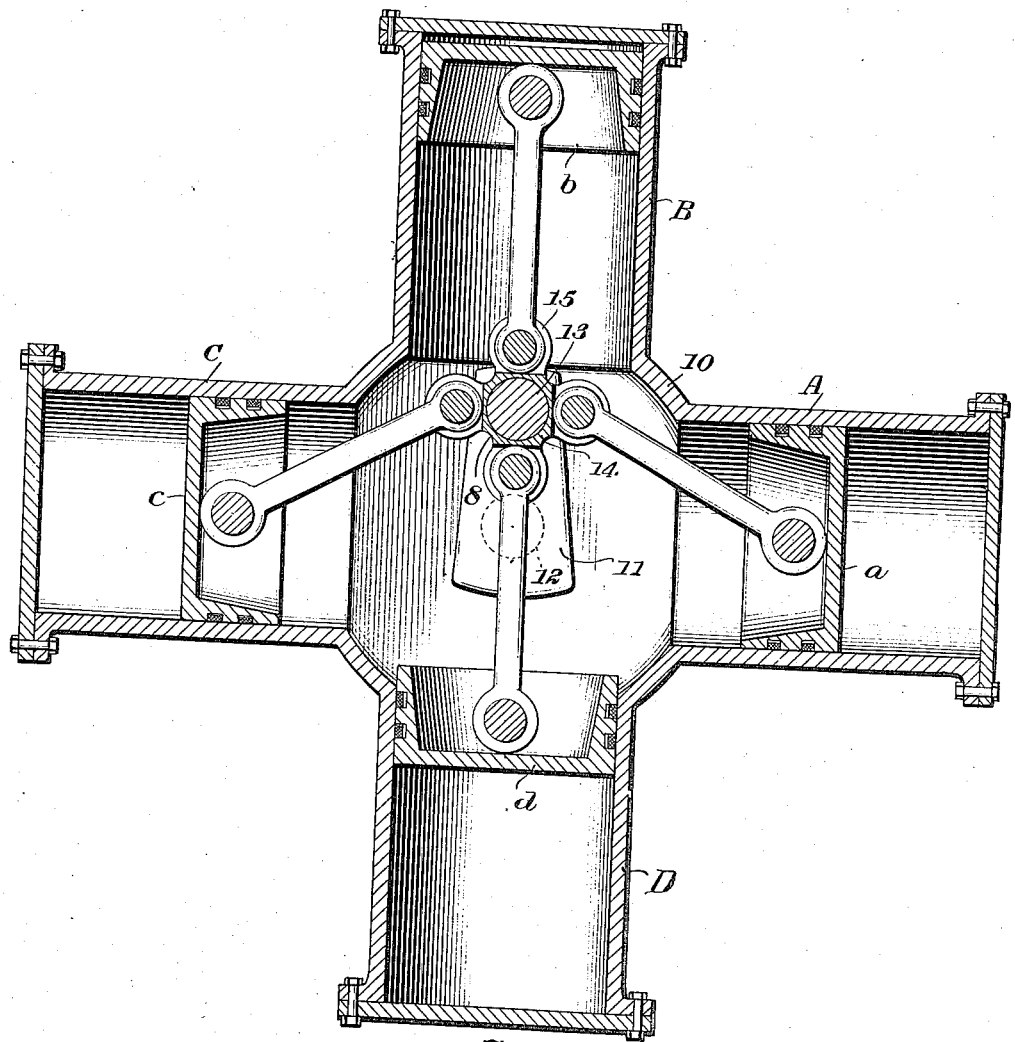
Figure 3:
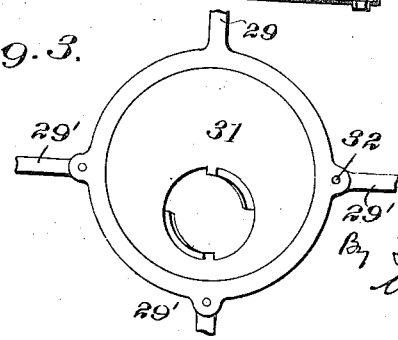

Figure 1 is a vertical longitudinal section through the engine; Fig. 2 is a section on the line 2—2, Fig. 1; and Fig. 3 is a detail of the eccentric for operating the valves.

The engine is preferably of the multi-cylinder hydrocarbon type, and in this particular instance comprises four cylinders, A, B, C, D, which are cast *en bloc* with a crank case 10. The cylinders are open to the crank case and each one is arranged to receive a piston $a$, $b$, $c$, $d$, respectively.

A crank shaft 12 is mounted in bearings 12' integral with the crank case and has mounted thereon crank arms 11, which receive crank pin 13. A spider 14 is journaled on the crank pin 13 and is provided with a series of spaced ears 15 each pair of which receive a wrist pin 16 for pivotally connecting the connecting rod 17 to the spider. The other end of the connecting rod is pivotally connected to the trunk piston by means of a wrist pin 18. The outside bearing 12' for the crank shaft is made air-tight by a suitable packing member 19.

The cylinders have cast integral therewith a series of radially extending conduits 20 which form fluid passages for conducting the fluid to the head ends of the cylinders. A port 21 connects the head end of the cylinder with the fluid passage and this port preferably extends entirely around the fluid passage as shown at 22. The cylinder head 23 is flanged as usual and bolted to the cylinder in any suitable manner. The fluid passage is preferably provided with a liner 24 which is provided with ports 25 opening into the port or passage 21, 22. A piston valve 26 works in this liner and has its stem 27 extending through a bearing or spider 28 connected to the liner. The stem 27 is connected to the eccentric rod 29 which is rigidly secured or integral with an eccentric strap 30 on an eccentric 31 mounted on and turning with the crank shaft. The eccentric rods 29' for the other piston valves are pivotally secured to the eccentric strap 30 by means of wrist pins 32, as shown in Fig. 2.

The crank shaft 12 has an extension 34 which has splined on it a sleeve 35 provided with a quick thread 36 which engages a coöperating thread in the eccentric 31. A rotatable shaft 37 has mounted upon it a lever 37' which engages with a collar 38 on the sleeve 35. This shaft is provided with an arm 39 which leads to a suitable controlling lever. The sleeve 35 can thus be shifted longitudinally of the shaft 34 so as to impart a rotative movement to the eccentric 31 with respect to the crank shaft, so as to vary the point of admission and cut-off of the fluid supplied to the head ends of the cylinders, and so as to permit the engine to be reversed. The eccentric 31 is restrained against endwise movement by being mounted between the bearing 12' and another bearing 33 which is secured by integral spider arms to the right hand side of the engine casting.

The right hand side of the engine casting is provided with a machined face 40 which is arranged to receive the machined face of a casing 41, the casing being secured to the engine casting by bolts extending through a flange 42 on the casing. The casing is provided with a partition 43 which separates the main chamber M, which forms the combustion chamber, from the end of the right hand crank shaft bearing. The casing as well as the partition is provided with passages 44 forming a water jacket, the water supply connection being shown at 45.

A fuel supply pipe 46 terminates in a fuel nozzle 47 extending through the end of the combustion chamber and surrounding this fuel nozzle is an air nozzle 48 which is connected to a compressed air pipe 49. The compressed air is furnished by a pump 50 which is driven by the crank shaft and supported by brackets 51 from the left hand side of the engine. The pipe connection to the compressed air pipe is shown at 52. The pipe 49 may lead to a suitable reservoir if so desired. Suitable spark plug contacts 54 are located in front of the fuel nozzle and connected by conductors to a suitable source of current. In this particular instance, the igniter is shown as of the high tension jump spark type although it may be of the low tension make and break type.

An annular hollow ring-shaped member 56 is located centrally in the combustion chamber and is provided in its inner wall with a series of apertures 56'. This ring-shaped member is connected to and in communication with the water jacket by means of the pipe 57. This pipe also supports the ring-shaped member 56 in front of the fuel nozzle. The partition 43 is provided with a series of holes 58 which however are preferably located near the outside walls of the combustion chamber so that the partition provides a shield to protect the crank shaft and the eccentric against direct contact with the hot gases. The crank case is further provided with open spaces or holes 60 so that the crank case of the engine and the fluid passages will be in constant communication with the combustion chamber.

In order that the combustion chamber may be drained and in order that the combustible fuel may be ignited directly the lower wall of the combustion chamber is provided with a hole 61 which is closed by a removable plug, so that a torch, a match, or a hot iron may be inserted directly therein to ingnite the gases. An outwardly closing and an inwardly opening valve 63 is mounted in the upper wall of the combustion chamber and is arranged to be opened by means of the handle 64. The pressure on the inside of the combustion chamber M will be sufficient to keep the valve closed. A safety valve 65 controlled by a spring is located in the hollow body of the valve 63 so as to limit the pressure in the combustion chamber.

The air and fuel are maintained under pressure in suitable reservoirs and similarly, the water must also be kept under pressure. This pressure must necessarily be higher than the pressure in the combustion chamber. The pressure may be obtained in any suitable manner, preferably, by connecting the pump 50 with the tops of these reservoirs if the fuel is a liquid, such as a heavy oil. After the fuel and air have been turned on they may be ingnited at the fuel nozzle thereby producing a gas under pressure in the combustion chamber. This gas constitutes a motive fluid which can be supplied to the engine. The water from the water jacket will be forced out of the apertures 56' in an annular jet across the flame issuing from the flame nozzle. The water so admitted will be turned into steam so as to cool the products of combustion and thereby lower the temperature of the fluid supplied to the engine, and the steam itself will furnish motive fluid and will raise the pressure. It will be understood that after the engine has been in operation for some time, the water will be turned into steam before it issues from the ring-shaped member 56, the evaporization taking place in the water jacket and in the pipe 56 and the annular ring, and in fact generally this steam will be superheated. This superheated steam will become thoroughly mixed with the products of combustion from the flame nozzle, and the annular jets will mix all the gases uniformly, so that a uniform motive fluid is supplied to the engine. When the engine is started, the lever 64 is depressed in order to lower the pressure, but as soon as the pressure rises the valve will automatically close.

It will be seen that the interior of the combustion chamber is in constant communication with the generator. If therefore, no fluid is admitted to the head ends of the cylinder, the pistons will soon reach a position where they will all come to rest, the pressure being equalized. If however, a fluid under pressure is admitted to the head end of the cylinder A, Fig. 2, then the pressure on opposite sides of the piston $a$ will be balanced and if the exhaust to the head end of cylinder C is open, then the internal pressure in the crank case will force the piston $c$ outwardly. Similarly, if the exhaust of D is open, and a fluid under pressure is admitted to the head end of cylinder B, so as to equalize the pressure on both sides of piston $b$, as shown in Figs. 1 and 2, then the internal pressure on $d$ will force the piston outwardly. In accordance with this invention therefore, a pressure is constantly maintained on one side of the piston and this pressure is intermittently counter-balanced so as to cause the piston to be intermittently actuated. It is not necessary of course to admit fluid during the full working stroke, but this fluid can be cut off, so as to use it expansively in the head end the same as in the ordinary steam engine.

In Figs. 1 and 2 the piston $b$ is at the beginning of its admission stroke and the piston $d$ at the beginning of its exhaust stroke. Due to the peculiar arrangement of elements and the peculiar application of the working fluid, the piston $d$ is the one that is starting on its working stroke since the effective pressure is outwardly and not inwardly. The exhaust takes place through the ends of the liners 24.

The advantages of this arrangement are that it permits the connecting rods to be under tension instead of compression, thereby resulting in minimum wear of bearings and in lightness of parts. The leakage is a minimum since the difference in pressures on the opposite sides of the cylinders during ordinary working conditions is a minimum, the torque moreover is more uniform. The generator for the working fluid can be directly connected to the crank case and can be in direct communication therewith so that the engine structure can be very much condensed.

The supply of working fluid to the engine will be uniform and there is no danger in this construction of the inert gases remaining near the fuel nozzle, in view of the fact that the engine constantly draws these gases out and thus there is a continual rush of gases from the fuel nozzle to the engine. It is not necessary to use a high grade hydrocarbon fuel as gasolene, as is the case in present day internal combustion engines, but a heavy oil, like crude oil which is exceedingly inexpensive, can be used, and this oil can be used without the necessity of the high compression which is necessary in engines of the Diesel type. The entire system is perfectly balanced, and most parts are under tension so that the amount of material can be a minimum for maximum strength.

It is obvious that various changes may be made in the details of construction without departing from this invention, and it is therefore to be understood that this invention is not to be limited to the specific construction shown and described.

I claim:

1. In an apparatus for generating motive power, the combination with a hydrocarbon motor including a chamber, a plurality of cylinders radiating therefrom, pistons in said cylinders, a combustion chamber secured to and connected with said first chamber, means for supplying a combustible fuel to said combustion chamber, conduits connecting said combustion chamber with the ends of said cylinders, and means for opening and closing said conduits.

2. In an apparatus for generating motive power, the combination with a reciprocating fluid pressure motor having a crank case, of a combusted hydrocarbon working fluid generator secured to and supported from said crank case.

3. In an apparatus for generating motive power, the combination with a reciprocating fluid pressure motor having a crank case, of a combusted hydrocarbon working fluid generator coaxial with said crank case, opening therein, and secured to and supported therefrom.

4. In an apparatus for generating motive power, the combination with a fluid pressure motor including a cylinder, a piston therein, a crank driven from the piston, and a crank case for said crank, of a hydrocarbon working fluid generator secured to and supported from said crank case, a valve for said cylinder, valve operating means on said crank shaft, and a partition between said generator and said valve operating means.

5. In an apparatus for generating motive power, the combination with a hydrocarbon motor including a casing and a crank shaft supported in a bearing therein, of a working fluid generator supported from and opening into said casing, and a deflecting wall between the bearing and the interior of the generator.

6. In an apparatus for generating motive power, the combination with a hydrocarbon motor having a crank case and a crank shaft therein, and a plurality of cylinders radiating from said crank case, of a working fluid generator coaxial with said crank case opening therein, and secured to and supported therefrom, and deflecting means for the crank shaft.

7. In an apparatus for generating motive power, the combination with a hydrocarbon motor having a crank case and a crank shaft therein, and a plurality of cylinders radiating from said crank case, of a working fluid generator secured to and in constant communication with said crank case interior, and fluid conduits radiating from said generator and connected to the ends of said cylinders and in constant communication with the generator.

8. In an apparatus for generating motive power, the combination with a hydrocarbon motor; of a combustion chamber connected directly to the motor and communicating with the interior of the crank case thereof, a fuel nozzle leading into the combustion chamber, and a baffle arranged between the nozzle and crank case.

9. In an apparatus for generating motive power, the combination with a hydrocarbon motor; of a combustion chamber connected to the motor, a fuel nozzle directed into the combustion chamber, a baffle arranged between the nozzle and one end of the combustion chamber, and a fuel injector between the baffle and nozzle.

10. In an apparatus for generating motive power, the combination with a hydrocarbon motor; of a combustion chamber connected directly to the motor and communicating with the interior of the crank case thereof, a fuel nozzle leading into the combustion chamber, a baffle arranged between the nozzle and one end of the combustion chamber, and a fuel injector between the baffle and nozzle.

In testimony whereof I affix my signature in presence of two witnesses.

EDWIN TAYLOR.

Witnesses:
J. H. BRUNINGA,
J. A. WATSON.